(12) United States Patent
Jung (10) Patent No.: US 9,722,449 B2
(45) Date of Patent: Aug. 1, 2017

(54) WIRELESS POWER TRANSMISSION SYSTEM, FURNITURE HAVING WIRELESS CHARGING FUNCTION USED THEREIN, AND WIRELESS POWER TRANSMISSION APPARATUS USED THEREIN

(71) Applicant: HANRIM POSTECH CO., LTD., Suwon-si, Gyeonggi-do (KR)

(72) Inventor: Chun-Kil Jung, Seoul (KR)

(73) Assignee: HANRIM POSTECH CO., LTD., Suwon-si, Gyeonggi-do (KR)

( * ) Notice: Subject to any disclaimer, the term of this patent is extended or adjusted under 35 U.S.C. 154(b) by 540 days.

(21) Appl. No.: 14/218,112

(22) Filed: Mar. 18, 2014

(65) Prior Publication Data

US 2014/0285140 A1    Sep. 25, 2014

(30) Foreign Application Priority Data

Mar. 19, 2013   (KR) ........................ 10-2013-0029346

(51) Int. Cl.
| | | |
|---|---|---|
| *H02J 7/02* | (2016.01) | |
| *H02J 5/00* | (2016.01) | |
| *H02J 7/00* | (2006.01) | |
| *H02J 17/00* | (2006.01) | |

(52) U.S. Cl.
CPC .............. *H02J 7/025* (2013.01); *H02J 5/005* (2013.01); *H02J 7/0021* (2013.01); *H02J 7/0047* (2013.01); *H02J 17/00* (2013.01)

(58) Field of Classification Search
CPC ...................................... H02J 7/025
USPC ....................................... 320/108
See application file for complete search history.

(56) References Cited

U.S. PATENT DOCUMENTS

| | | | |
|---|---|---|---|
| 2005/0068019 A1 | 3/2005 | Nakamura et al. ........... 323/355 |
| 2008/0030975 A1 | 2/2008 | Miyashita et al. |
| 2009/0096413 A1 | 4/2009 | Partovi et al. ................ 320/108 |
| 2010/0290215 A1 | 11/2010 | Metsalf et al. ............... 362/127 |
| 2010/0327803 A1 | 12/2010 | Katsura |
| 2012/0098486 A1* | 4/2012 | Jung ....................... H02J 7/025 320/108 |

(Continued)

FOREIGN PATENT DOCUMENTS

| | | |
|---|---|---|
| DE | 10 2006 027 824 A1 | 12/2007 |
| DE | 20 2012 104 775 U1 | 2/2013 |

(Continued)

OTHER PUBLICATIONS

European Search Report dated Sep. 5, 2014, issued to European Application No. 14159990.2-1806.

(Continued)

*Primary Examiner* — Thuan Do
(74) *Attorney, Agent, or Firm* — Envision USA Inc.

(57) ABSTRACT

Disclosed herein is a furniture having a wireless charging function, including: one or more transmission coil units disposed on the same plane of a flat plate of the furniture; and a central transmission controlling unit configured to select at least one transmission coil unit corresponding to a wireless power reception apparatus when the wireless power reception apparatus is placed on the flat plate, and to transmit a wireless power signal through the selected transmission coil unit, the central transmission controlling unit being installed separately from the plurality of transmission coil units.

9 Claims, 5 Drawing Sheets

(56) References Cited

U.S. PATENT DOCUMENTS

| 2012/0235636 A1* | 9/2012 | Partovi | H02J 7/025 320/108 |
|---|---|---|---|
| 2012/0242276 A1 | 9/2012 | Jung et al. | |
| 2013/0175877 A1 | 7/2013 | Abe et al. | 307/104 |

FOREIGN PATENT DOCUMENTS

| JP | 2004-093707 A | 3/2004 |
|---|---|---|
| JP | 2008-060058 A | 3/2008 |
| JP | 2011-010444 A | 1/2011 |
| JP | 2012-205499 A | 10/2012 |
| WO | WO 2011/151503 A1 | 12/2011 |
| WO | WO 2012/102075 A1 | 8/2012 |

OTHER PUBLICATIONS

Examination Report dated Apr. 30, 2015, issued to European Application No. 14 159 990.2.

\* cited by examiner

WIRELESS POWER TRANSMISSION SYSTEM, FURNITURE HAVING WIRELESS CHARGING FUNCTION USED THEREIN, AND WIRELESS POWER TRANSMISSION APPARATUS USED THEREIN

CROSS-REFERENCE TO RELATED APPLICATIONS

This application claims the benefit of Korean Patent Application No. 10-2013-0029346, filed on Mar. 19, 2013, in the Korean Intellectual Property Office. All disclosures of the document named above are incorporated herein by reference.

BACKGROUND OF THE INVENTION

Field of the Invention

The present invention relates to a wireless power transmission system, a furniture having a wireless charging function used therein, and a wireless power transmission apparatus used therein capable of conveniently charging a portable electronic device such as a smart phone, or the like.

Description of the Related Art

Generally, a battery pack supplies an operation power to a portable electronic device (such as a cellular phone, personal digital assistant, or the like). The battery pack is charged by receiving a power (such as electric energy) from an external charger, and is configured to include a battery cell in which the electric energy is stored, a circuit for charging and discharging (that is, supplying the electric energy to the battery cell, and from there to the portable electronic device), and the like.

To electrically connect a charger to the battery pack, thus charging the battery pack with electrical energy, one possible method is a terminal supplying scheme: namely, receiving a commercial power, converting the commercial power into a voltage and a current appropriate for the battery pack, and supplying the electric energy of the converted power to the battery pack through terminals of the battery pack.

However, when power is supplied using the terminal supplying scheme, as the charger contacts the battery pack or is separated from the battery pack, a terminal of the charger and a terminal of the battery pack may have different potential differences, which may cause an instantaneous discharging phenomenon.

Importantly, when foreign materials have accumulated on these terminals, there is a risk that a fire or the like will occur due to the instantaneous discharging phenomenon.

In addition, the electric energy charged in the battery pack is naturally discharged to the outside environment through the terminal of the battery pack due to moisture or the like, such that a lifespan of the battery pack may be decreased and performance thereof may be deteriorated.

In order to solve these problems, contactless charging systems and control methods using a wireless power transmission scheme have been recently suggested.

In particular, attempts to apply the contactless charging system to electronic devices that need to be charged frequently (e.g. smart phones, tablets, laptop personal computers, or the like) have been conducted. Since a battery should be frequently charged, especially in a smart phone which is often running various applications, users have recently felt the need to carry a separate charging battery (external battery), which is inconvenient. A convenient charging method is therefore preferable.

However, a charger is not always conveniently available, or the user may not think about the need to charge the smart phone, even when the smart phone is not being otherwise used. Therefore, there is a need for a system which simply and conveniently charges a battery pack of a smart phone when the user does not use the smart phone for a while.

SUMMARY OF THE INVENTION

According to an aspect of the present invention, there is provided a wireless power transmission system including: a wireless power transmission apparatus; and a wireless power reception apparatus, wherein the wireless power transmission apparatus includes: a plurality of transmission coil units; and a central transmission controlling unit, which selects at least one transmission coil unit from the plurality of transmission coil units when the wireless power reception apparatus is positioned on the selected transmission coil unit, and which transmits a wireless power signal through the selected transmission coil unit, the central transmission controlling unit being installed separately from the plurality of transmission coil units, and the wireless power reception apparatus includes: a reception coil which receives the wireless power signal generated from the selected transmission coil unit; a rectifier which rectifies an alternating current (AC) power generated by reception coil; and a battery cell module which is charged with a rectified power from the rectifier.

The central transmission controlling unit may select at least two transmission coil units when a plurality of wireless power reception apparatuses are positioned on the selected transmission coil units, and may transmit the wireless power signals through the selected transmission coil units, respectively.

The central transmission controlling unit may include: an object sensor unit which senses a variation in one of a current and a voltage in the plurality of transmission coil units to generate an object sensing signal; a switching controller which turns on and off supplying of a power to each of the plurality of transmission coil units; a driving driver and a resonant converter; and a transmission controller which selects the selected transmission coil unit where the wireless power reception apparatus is positioned based on the object sensing signal from the object sensor unit, controls the switching controller to control a switching unit to transfer a driving signal to the selected transmission coil unit, and controls the driving driver and the resonant converter to transmit an ID request signal to the selected transmission coil unit when it receives the object sensing signal and to transmit a wireless power transmission signal when it receives an ID signal from the wireless power reception apparatus according to the ID request signal.

According to another embodiment of the present invention, there is provided a furniture having a wireless charging capability, including: a plurality of transmission coil units disposed on the same plane of a flat plate of the furniture; and a central transmission controlling unit which selects at least one of the plurality of transmission coil units when the wireless power reception apparatus is placed on the flat plate upon the at least one selected transmission coil unit, and which transmits a wireless power signal through the at least one selected transmission coil unit, and the central transmission controlling unit may be installed separately from the plurality of transmission coil units.

The plurality of transmission coil units may be installed in parallel with each other on the upper surface of the flat plate, and the central transmission controlling unit may be installed on a lower surface of the center of the flat plate, and may include: an object sensor unit which senses a variation in one of a current and a voltage in the plurality of transmission coil units to generate an object sensing signal; a switching controller which turns on and off supplying of a power to the transmission coil unit; and a transmission controller which selects a transmission coil unit where the wireless power reception apparatus is positioned, based on the object sensing signal from the object sensor unit, and control the switching controller to control a switching unit to transfer a driving signal to the selected transmission coil unit.

The central transmission controlling unit may further include a driving driver and a resonant converter, and the transmission controller may control the driving driver and the resonant converter to transmit an ID request signal to the selected transmission coil unit when it receives the object sensing signal from the object sensor unit, and to transmit a wireless power transmission signal when it receives an ID signal from the wireless power reception apparatus according to the ID request signal.

The plurality of transmission coil units may be disposed so as to be non-overlapped with each other.

The transmission coil unit may include: a transmission coil; and a shielding core part including an accommodating part where the transmission coil is partially accommodated and seated.

The furniture having a wireless charging function may further include a cable connecting the plurality of transmission coil units to the central transmission controlling unit in a wired scheme.

The furniture having a wireless charging function may further include a coating part covering the plurality of transmission coil units.

The coating part may include a light emitting part emitting a light using the wireless power signal generated from the transmission coil unit.

The coating part further may include: an induction coil which receives the wireless power signal, and transfers a power to the light emitting part; a coating controller which rectifies the power generated from the induction coil, and controls an operation of the light emitting part; a light guide plate which transfers the light generated from the light emitting part; a pattern forming plate disposed on the light guide plate and having a pattern formed thereon; and a transparent protective film layer adhered onto the pattern forming plate.

The coating controller may receive a charging state information transmitted from the wireless power reception apparatus through the induction coil, and may control an operation of the light emitting part based on the charging state information.

According to still another embodiment of the present invention, there is provided a wireless power transmission apparatus including: a plurality of transmission coil units; and a central transmission controlling unit which selects a transmission coil unit from the plurality of transmission coil units when a wireless power reception apparatus is positioned on the selected transmission coil unit, and transmits a wireless power signal through the selected transmission coil unit, and the central transmission controlling unit may be installed separately from the plurality of transmission coil units.

The central transmission controlling unit may include: an object sensor unit which senses a variation in one of a current and a voltage in the plurality of transmission coil units to generate an object sensing signal; a switching controller which turns on and off supplying of a power to the transmission coil unit; and a transmission controller which selects the selected transmission coil unit where the wireless power reception apparatus is positioned based on the object sensing signal from the object sensor unit, and controls the switching controller to control a switching unit to transfer a driving signal to the selected transmission coil unit.

The central transmission controlling unit may further include a driving driver and a resonant converter, and the transmission controller may control the driving driver and the resonant converter to transmit an ID request signal to the selected transmission coil unit when it receives the object sensing signal from the object sensor unit, and to transmit a wireless power transmission signal when it receives an ID signal from the wireless power reception apparatus according to the ID request signal.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

In the following description, the terms "module", "part", and "unit" are used only for convenience. These terms do not have meanings or roles that distinguish components from each other or generally.

Hereinafter, a dining table is shown as a typical example of a furniture having a wireless charging function (i.e. a wireless power transmission apparatus). It is to be understood that the present invention is not limited thereto, but may be applied to any furniture having a flat surface where one or more electronic devices may be placed, including but not limited to an office table, a dresser, a desk, a shelf, or the like.

Likewise, a smart phone is shown as a typical example of a device with a chargeable battery pack (i.e. a wireless power reception apparatus). It is to be understood that the present invention is not limited thereto, but may be applied to any device that may receive power wirelessly, including but not limited to a tablet, a laptop, or the like.

Hereinafter, a wireless power transmission system, a furniture having a wireless charging function used therein, and a wireless power transmission apparatus used therein, according to an embodiment of the present invention, will be described with reference to the accompanying drawings.

Figure 1:
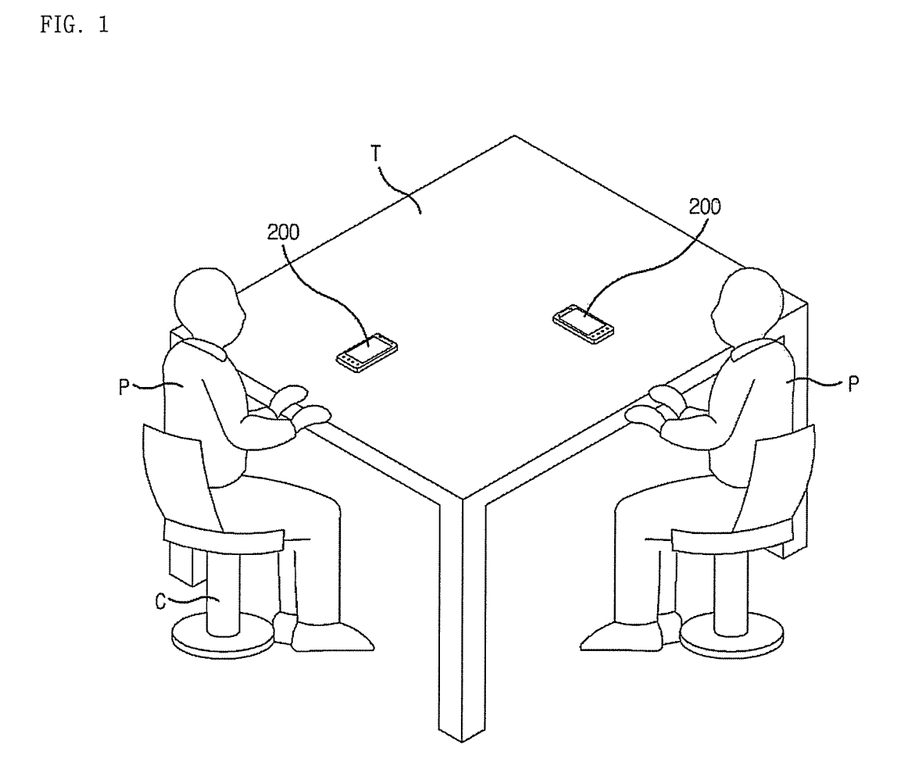
FIG. 1 is a view illustrating a furniture having a wireless charging function, according to an embodiment of the present invention.

FIG. 1 is a view illustrating a furniture having a wireless charging function according to an embodiment of the present invention. As shown in FIG. 1, when people P have a meal or hold a meeting, they sit down on chairs C and place smart phones (wireless power reception apparatuses) 200 on a table T. In this case, wireless power signals are transmitted to the smart phones 200 through transmission coils at which the smart phones 200 are positioned among a plurality of transmission coils 101 (See FIGS. 4 and 5) disposed on an upper surface of the table T, such that the smart phones 200 are charged.

According to an embodiment of the present invention as described above, even when a user does not consciously intend to charge the smart phone, the smart phone may be charged, such that discharging of the smart phone may be delayed.

Next, a detailed configuration of the embodiment described above will be described in more detail with reference to FIGS. 2 to 5.

Figure 2:
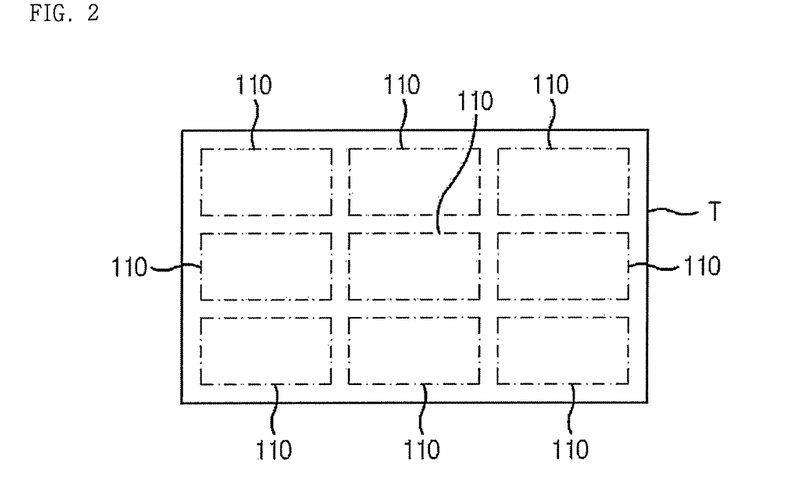
FIG. 2 is a top view of the furniture having a wireless charging function, illustrating a disposition of transmission coil units in the furniture, according to an embodiment of the present invention.

FIG. 2 is a top view of a furniture having a wireless charging function, illustrating a disposition of transmission coil units in the furniture, according to an embodiment of the present invention. As shown in FIG. 2, a plurality of transmission coil units 110 are disposed in parallel with each other on the upper surface of the table T. The transmission coil units 110 may be arranged in a matrix layout as shown. The transmission coil units 110 may be installed on the table T in a form in which they are buried in recess parts formed in a flat plate of the table T, or may be disposed on an upper surface of the flat plate of the table T and be then protected by a coating part 130 (see FIGS. 3 and 6) disposed thereon. Meanwhile, a light emitting part may be adhered to the coating part, which may provide guidance to the user so as to position the wireless power reception apparatus at an accurate charging position. This will be described in more detail with reference to FIGS. 6A and 6B.

The transmission coil units 110 are not limited to being disposed in the matrix layout depicted, but may be limited to a circumferential region of the table T, or be arranged more distantly from each other, or disposed with no ordered arrangement at all; other dispositions will also be apparent to those skilled in the art. Likewise, although nine transmission coil units 110 are depicted, any number of such units may be provided without departing from the scope of the invention.

Hereinafter, dispositions of transmission coil units 110 and a central transmission controlling unit 120 will be described in more detail with reference to FIG. 3.

Figure 3:
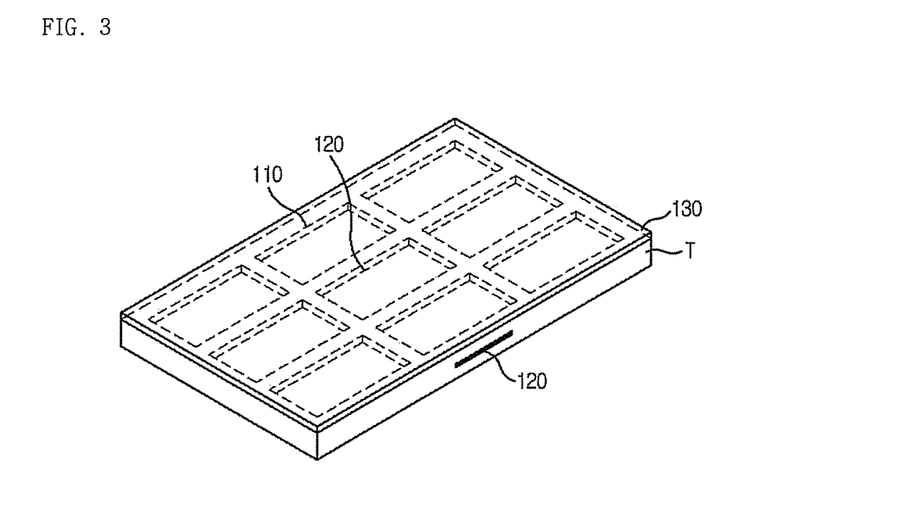
FIG. 3 is a perspective view of the furniture having a wireless charging function, illustrating dispositions of transmission coil units, a central transmission controlling unit, and a coating part in the furniture, according to an embodiment of the present invention.

FIG. 3 is a perspective view of the furniture having a wireless charging function, illustrating dispositions of transmission coil units 110, a central transmission controlling unit 120, and a coating part 130 in the furniture, according to an embodiment of the present invention. Similar to FIG. 2, the plurality of transmission coil unit 110 may be disposed on the upper surface of the table T, for instance in a matrix layout of nine units as depicted. Furthermore, a central transmission controlling unit 120 may be insertedly installed in the side of the table T. Because the central transmission controlling unit 120 may be inserted into a slot formed in the side, when a fault occurs in the transmission controlling unit 120, the transmission controlling unit 120 may be easily accessed and repaired or replaced. Meanwhile, the central transmission controlling unit 120 and the transmission coil units 110 are connected to a cable (not shown) in a wired scheme, such that a wireless power signal is transmitted from the transmission coil unit 110, under a control of the central transmission controlling unit 120, to the smart phone or other wireless power reception apparatus (see FIG. 5), which receives and rectifies the wireless power signal and then charges a battery cell module.

Although FIG. 3 depicts the central transmission controlling unit 120 as inserted into the side of the table T, the central transmission controlling unit 120 is not limited to being inserted into the side, but may be installed at the center of a lower surface of the table T. In this case, since a length of the cable between the central transmission controlling unit 120 and the transmission coil units 110 may be minimized, power consumption may be decreased and a manufacturing cost may be decreased. Other dispositions will also be apparent to those skilled in the art. Additionally, as already noted above, the invention is not limited to a particular layout, or number, of transmission coil units 110.

Figure 4:
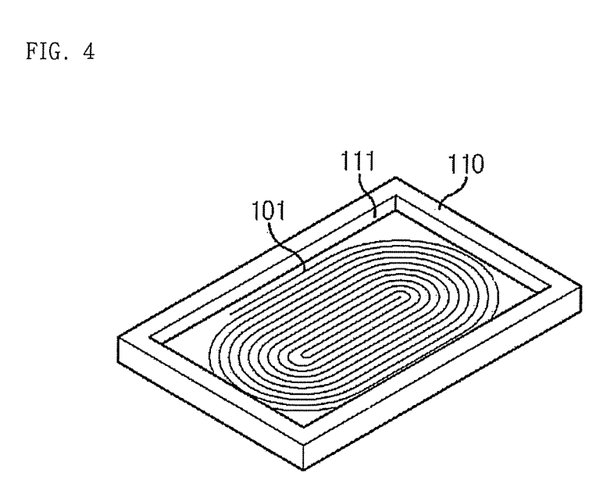
FIG. 4 is a perspective view of the transmission coil unit, according to an embodiment of the present invention.

FIG. 4 is a perspective view of a transmission coil unit, according to an embodiment of the present invention. As shown in FIG. 4, the transmission coil unit 110 may be configured to include a transmission coil 101 having an oval shape and a shielding core part 111 including a recess part where the transmission coil is accommodated. The shielding core part 111 may be made of a ferrite material which absorbs or reflects a magnetic field generated from the transmission coil 101. Therefore, the central transmission controlling unit 120, to be installed outside the shielding core part 111, is not affected by the magnetic field of the transmission coil 101. In addition, the magnetic field generated from the transmission coil may be focused toward the wireless power reception apparatus to increase transmission efficiency.

A size of a groove part formed in the table T may be matched to that of the shielding core part 111 when the transmission coil unit 110 is buried in the table T, thereby making it possible to accurately attach the transmission coil unit 110 to the upper surface of the table T, and it is easy to smoothly process the upper surface of the table T when the coating part 130 is installed above the transmission coil unit 110. Meanwhile, a pattern representing a charging position may be formed on the coating part 130, such that the user may place the wireless power reception apparatus at an accurate charging position. Additionally or alternatively, the coating part 130 may be provided with a light emitting part to provide guidance to the user so as to position the wireless power reception apparatus to an accurate charging position. A structure using the light emitting part will be described in detail with reference to FIGS. 6A and 6B.

Next, an electronic configuration and an operation of the furniture having a wireless charging function according to an embodiment of the present invention will be described with reference to FIG. 5.

Figure 5:
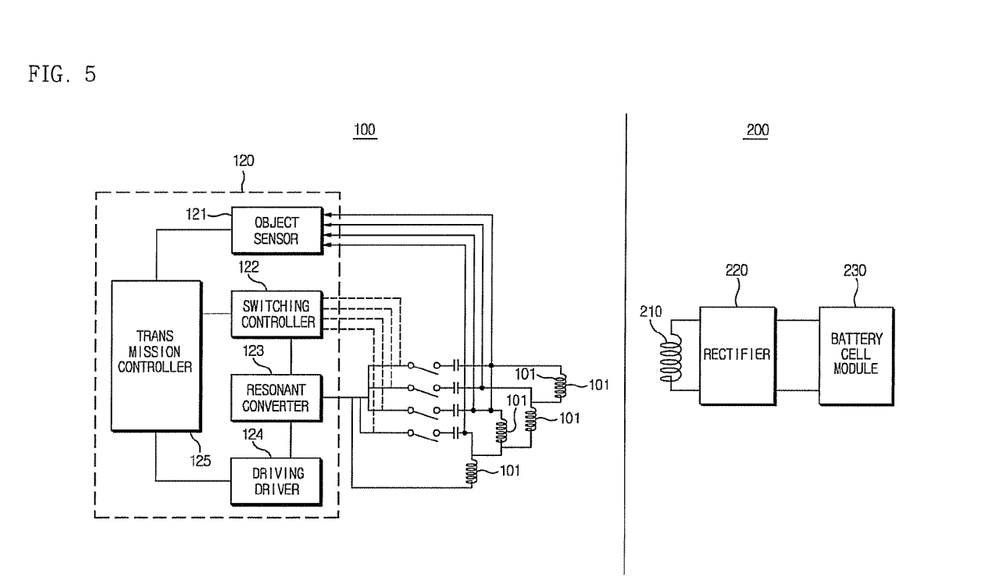
FIG. 5 is a block diagram illustrating a wireless power transmission system comprising the furniture having a wireless charging function, according to an embodiment of the present invention.

FIG. 5 is a block diagram illustrating a wireless power transmission system including the furniture having a wireless charging function according to an embodiment of the present invention. As shown in FIG. 5, the wireless power transmission system comprises a wireless power transmission apparatus 100 and a wireless power reception apparatus 200. When the wireless power transmission apparatus 100 transmits the wireless power signal to the wireless power reception apparatus 200 in an electromagnetic induction scheme, the wireless power reception apparatus 200 receives the wireless power signal and charges its battery with a power of the wireless power signal or supplies the power to an electronic device connected thereto. Here, the wireless power transmission apparatus 100 comprises a plurality of transmission coils 101 that are disposed separately from each other; at least one transmission coil, corresponding to a position at which the wireless power reception apparatus 200 is placed among the plurality of transmission coils 101, transmits the wireless power signal. Therefore, the power is supplied to the wireless power reception apparatus 200.

Hereinafter, configurations of the wireless power transmission apparatus 100 and the wireless power reception apparatus 200 will be described, respectively.

The wireless power transmission apparatus 100 according to an embodiment of the present invention comprises the plurality of transmission coils 101 and the central transmission controlling unit 120. Here, the transmission coils (also referred to as primary coils) 101 are devices for transmitting the power signals to a reception coil 210 of the wireless power reception apparatus 200 in an electromagnetic induction scheme. In the depicted embodiment, the number of transmission coils is four, and the plurality of transmission coils 101 are separate components connected to the central transmission controlling unit 120 through the cable, as shown in FIG. 3. Although four transmission coils 101 are depicted, any number of such coils may be provided without departing from the scope of the invention. Additionally, although the following paragraphs refer to a "plurality" of transmission coils, this is to conveniently describe the coil selection processes of the central transmission controlling unit 120, and the number of transmission coils 101 may be one. As shown above in FIG. 4, each transmission coil may be part of, and associated with, one of the transmission coil units 110.

Referring to FIG. 5, when the wireless power reception apparatus 200 is placed on the flat plate of the furniture, the central transmission controlling unit 120 selects at least one transmission coil corresponding to the position at which a wireless power reception apparatus 200 is placed. The central transmission controlling unit 120 then transmits the wireless power signal through the selected transmission coil. The central transmission controlling unit 120 is installed separately from the plurality of transmission coils 101. The central transmission controlling unit 120 may include an object sensor unit 121, a switching controller 122, a resonant converter 123, a driving driver 124, and a transmission controller 125.

The object sensor unit 121 serves to sense a load change of the transmission coil 101, judge whether the corresponding load change has been generated by the wireless power reception apparatus 200 (that is, confirm an ID), and filter and process a response signal transmitted from the wireless power reception apparatus 200. That is, the object sensor unit 121 receives, filters, and processes an object response signal, which is a response to an object sensing signal transmitted through the transmission coil 101. In addition, the object sensor unit 121 serves to process a charging detection signal (that is, a signal including information on a rectification voltage measured by a rectifier 220) transmitted through a reception coil (also referred to as a secondary coil) 210 of the wireless power reception apparatus 200. In other words, the object sensor unit 121 serves to sense at which of the plurality of transmission coils 101 the wireless power reception apparatus 200 is positioned, in order to generate the object sensing signal and provide the object sensing signal to the transmission controller 125 (described further below), and additionally serves to receive an ID signal and a charging state signal from the wireless power reception apparatus 200. In at least some embodiments, the object sensor unit 121 may be able to select more than one transmission coil at once, when a plurality of wireless power reception apparatuses 200 positioned on separate transmission coils are detected. Any references to a single selected coil are for convenience and should not be interpreted to limit the scope of the invention to only one selected coil at a time.

The switching controller 122 controls switching operations of switches disposed between the resonant converter 123 (described further below) and the transmission coils 101. That is, when the transmission coil corresponding to the wireless power reception apparatus is selected by the object sensor unit 121, the switching controller 122 serves to turn on a switch associated with the coil that is selected and turn off all switches associated with any coils that are not selected, thereby allowing the power signal from the resonant converter 123 to be transferred only to the coil that is selected.

The resonant converter 123 generates a transmission power, which generates a power signal to be transmitted under a control of the driving driver 124 (described further below), and supplies the generated transmission power to the transmission coil 101. When the transmission controller 125 (described further below) transmits a power control signal, which controls the transmission of a power signal having a required power value to the driving driver 124, the driving driver 124 controls an operation of the resonant converter 123 depending on the transmitted power control signal, and the resonant converter 123 applies a transmission power corresponding to the required power value to the transmission coil 101 under the control of the driving driver 124, thereby allowing a wireless power signal having a required strength to be transmitted. When it is judged that multiple wireless power reception apparatuses have been placed on the plurality of transmission coils, the resonant converter 123 generates separate power signals with respect to the respective transmission coils. Therefore, independent wireless power signals are generated.

In addition, the resonant converter 123 serves to supply powers which generate the object sensing signals transmitted through the transmission coils, under the control of the driving driver 124.

The driving driver 124 controls an operation of the resonant converter 123 under a control of the transmission controller 125.

The transmission controller 125 serves to receive and confirm a judgment result of the object sensor unit 121 in order to select the transmission coil where the wireless power reception apparatus is positioned among the plurality of transmission coils 101, and to control the switching unit to transfer a driving signal to the selected transmission coil. In addition, the transmission controller 125 serves to transmit the power signal which controls the wireless power signal transmission through the selected transmission coil 101 to the driving driver 124.

That is, the transmission controller 125 analyzes and processes data signals (the ID signal and the charging state signal) received by the object sensor unit 121, and controls the driving driver 124 depending on the data signal. In addition, the transmission controller 125 serves to generate the object sensing signal and transmit the generated object sensing signal to the wireless power reception apparatus 200 through the transmission coil 101. That is, the transmission controller 125 serves to control the driving driver 124 and the resonant converter 123 to transmit an ID request signal to the selected transmission coil when it receives the object sensing signal from the object sensor unit 121, and to transmit the wireless power transmission signal when it receives the ID signal from the wireless power reception apparatus 200 according to the ID request signal.

In addition, the wireless power reception apparatus 200 comprises the reception coil 210 generating an induced power by the transmitted power signal, the rectifier 220 rectifying the induced power, and the battery cell module 230 charging a battery cell with the rectified power.

Here, the battery cell module 230 may comprise a protection circuit such as an overvoltage and overcurrent preventing circuit, a temperature sensing circuit, or the like, and may further comprise a charging managing module collecting and processing information such as a charged state of the battery cell, or the like.

Although the wireless power reception apparatus 200 has been described and depicted with a battery cell 230, it is to be understood that the present invention is not limited thereto, and the wireless power reception apparatus 200 may supply a constant operation power without a battery while its position on the wireless power transmission apparatus 100 is maintained. Thus, the invention may be used to power a device that traditionally (or currently) carries no battery, and instead is normally provided with a constant operation power from an electrical outlet or similar. Such devices include but are not limited to desktop printers, lamps, or clocks, among many other options.

Next, a coating part capable of informing a user whether the wireless power reception apparatus is appropriately placed at a charging position, in the wireless power transmission system having the above-mentioned configuration, will be described with reference to FIGS. 6A and 6B.

Figure 6:
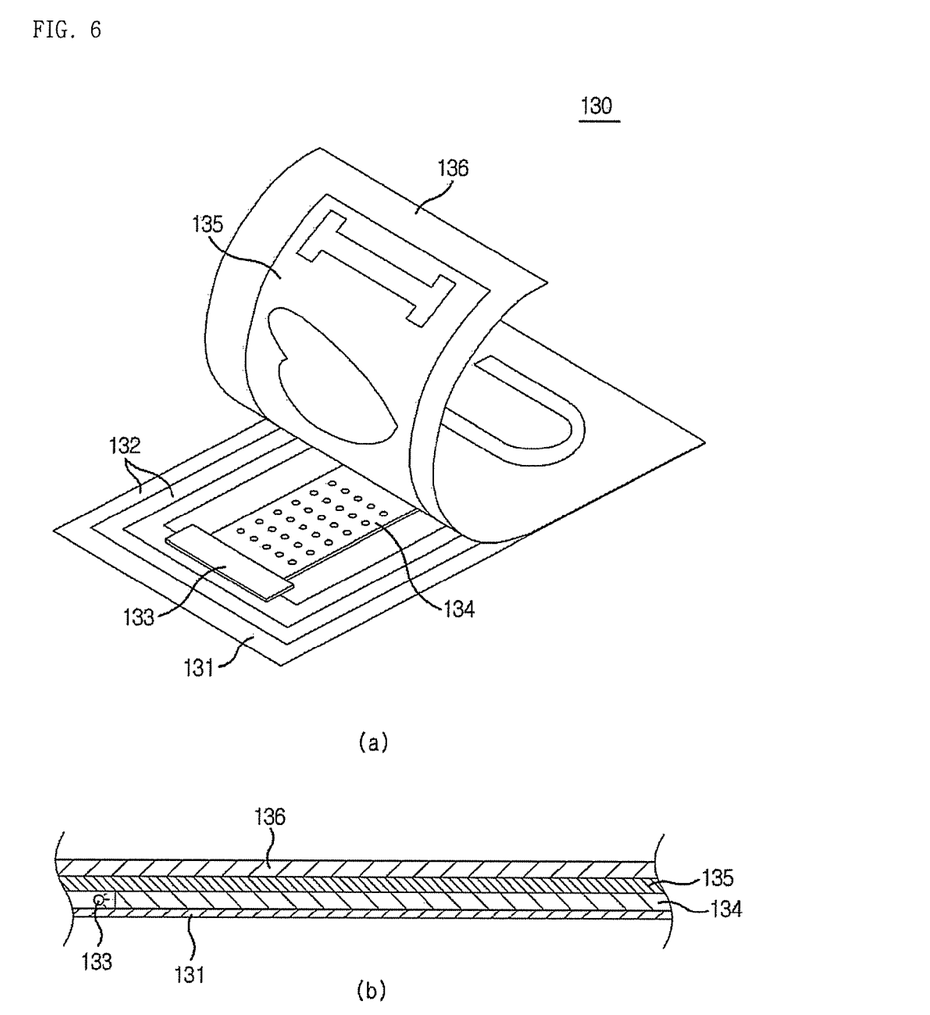
FIGS. 6A and 6B are views illustrating a coating part used in the furniture having a wireless charging function, according to an embodiment of the present invention.

FIGS. 6A and 6B are views illustrating a coating part used in the furniture having a wireless charging function according to an embodiment of the present invention. FIG. 6A is a partially exploded perspective view for describing an inner portion of the coating part, and FIG. 6B is a cross-sectional view of the coating part. As shown in FIG. 6, the coating part 130 may include a base part 131; an induction coil 132 installed on the base part 131, receiving the wireless power signal of the wireless power transmission apparatus 100, and generating an alternating current (AC) power; a light emitting part 133 emitting a light by the power generated by the induction coil 132; a light guide plate 134 guiding the light from the light emitting part 133; a pattern forming plate 135 disposed on the light guide plate 134 and having a pattern formed thereon; and a protective film layer 136 disposed on the pattern forming plate 135.

The base part 131, which is adhered to a flat plate portion of the furniture, has an adhesive layer formed therebeneath to allow the coating part 130 to be adhered onto the flat plate of the furniture.

The induction coil 132 generates the AC power using a magnetic field depending on the wireless power signal when the wireless power signal is transmitted from the wireless power transmission system, such that it functions as a light emitting power source of a light emitting part 133 (described further below).

The light guide plate 134 is positioned on the same plane as that of the light emitting part 133, and guides the light emitted from the light emitting part in a transverse direction. Only a portion of the light guided by the light guide plate 134 is allowed through the pattern forming plate 135 to be visible by a user. That is, a light is allowed through in a specific shape, depending on a shape of the pattern forming plate 135, and the user may recognize whether the wireless power reception apparatus 200 is currently placed at the charging position based on whether or not the light is visible.

The transparent protective film layer 136 for protecting the pattern forming plate 135 may be disposed on the pattern forming plate 135.

Meanwhile, a coating controller (not shown) controlling the light emitting of the light emitting part 132 may receive the charging state information from the wireless power reception apparatus 200 and control an operation of the light emitting part 133 based on the received charging state information. Therefore, the user may confirm a current charging state. For example, the coating controller may allow the light emitting part 133 to strongly emit the light when the wireless power reception apparatus 200 becomes close to the charging position based on the charging state information and allows the light emitting part 133 to weakly emit the light when the wireless power reception apparatus 200 becomes distant from the charging position based on the charging state information, thereby providing guidance to the user so as to move the wireless power reception apparatus 200 to a more accurate charging position. Further, the coating controller may change a color of the light emitting part 133 when the wireless power reception apparatus 200 is fully charged, thereby allowing the user to easily recognize that the wireless power reception apparatus 200 has been fully charged.

Alternatively, a magnetic light emitting layer may be used instead of the light emitting part 133, emitting the light using the magnetic field depending on the transmission of the wireless power signal. In the magnetic light emitting layer, which is a layer containing a material such as luminescent magnetic particles (or LuMaPs) emitting the light using power from the magnetic field, a light emitting degree, a light emitting pattern, a light emitting color, or the like, may be changed depending on a magnitude of the magnetic field, which is generated depending on the transmission of the wireless power signal. It may be visually confirmed by the magnetic light emitting layer whether the wireless power reception apparatus 200 has been positioned at the charging position.

According to an embodiment of the present invention having the above-mentioned configuration, when a plurality of wireless power reception apparatuses are placed on a table T, appropriate wireless power transmission signals are simultaneously transmitted to the plurality of wireless power reception apparatuses using one central transmission controlling unit and a plurality of transmission coils, thereby making it possible to supply the power to the plurality of wireless power reception apparatuses.

According to an embodiment of the present invention having the above-mentioned configuration, when a user has a meal at a table or works at a desk, a smart phone is automatically charged when the user places the smart phone on the furniture, such that it may be conveniently charged.

In addition, since the wireless power signals may be individually transmitted by only one central transmission controlling unit and the plurality of transmission coils, the plurality of wireless power reception apparatuses may be charged. Therefore, a manufacturing cost may be decreased to improve an economical efficiency.

Although a few embodiments of the present invention have been shown and described, it would be appreciated by those skilled in the art that changes may be made in this embodiment without departing from the principles and spirit of the invention, the scope of which is defined in the claims and their equivalents. In particular, all or some of the above mentioned embodiments may be selectively combined with each other so that they may be variously modified.

What is claimed is:

1. A furniture having a wireless charging capability, the furniture comprising:
    a plurality of transmission coil units disposed distantly from each other on the same plane of a flat plate of the furniture; and
    a central transmission controlling unit,
    wherein the central transmission controlling unit selects at least one transmission coil unit where a wireless power reception apparatus is placed, and transmits a wireless power signal through the at least one transmission coil unit, and
    wherein the central transmission controlling unit is separably installed from the plurality of transmission coil units,
    wherein the central transmission controlling unit and the plurality of transmission coil units are connected to a cable,
    wherein the plurality of transmission coil units are installed in parallel with each other on an upper surface of the flat plate,
    wherein the central transmission controlling unit is installed on a lower surface of the flat plate, and comprises:
    an object sensor unit;
    a switching controller; and
    a transmission controller,
    wherein the object sensor unit senses a variation in one of a current and an voltage in the plurality of transmission coil units to generate an object sensing signal,
    wherein the switching controller turns on and off supplying of a power to the plurality of transmission coil units respectively, and
    wherein the transmission controller selects the at least one transmission coil unit where the wireless power reception apparatus is placed, based on the object sensing signal from the object sensor unit, and controls the switching controller to control a switching unit to transfer a driving signal to the at least one transmission coil unit.

2. The furniture having a wireless charging function of claim 1,
    wherein the central transmission controlling unit further comprises a driving driver and a resonant converter, and
    wherein the transmission controller controls the driving driver and the resonant converter to transmit an ID request signal to the at least one transmission coil unit when it receives the object sensing signal from the object sensor unit, and to transmit a wireless power transmission signal when it receives an ID signal from the wireless power reception apparatus according to the ID request signal.

3. The furniture having a wireless charging function of claim 1, wherein the plurality of transmission coil units are disposed so as to be non-overlapped with each other.

4. The furniture having a wireless charging function of claim 1, wherein the at least one transmission coil unit comprises:
    a transmission coil; and
    a shielding core part comprising an accommodating part where the transmission coil is partially accommodated and seated.

5. The furniture having a wireless charging function of claim 1, further comprising a cable connecting the plurality of transmission coil units to the central transmission controlling unit in a wired scheme.

6. The furniture having a wireless charging function of claim 1, further comprising a coating part covering the plurality of transmission coil units.

7. The furniture having a wireless charging function of claim 6, wherein the coating part comprises a light emitting part emitting a light using the wireless power signal generated from the at least one transmission coil unit.

8. The furniture having a wireless charging function of claim 7, wherein the coating part further comprises:
    an induction coil;
    a coating controller;
    a light guide plate;
    a pattern forming plate disposed on the light guide plate and having a pattern formed thereon; and
    a transparent protective film layer adhered onto the pattern forming plate,
    wherein the induction coil receives the wireless power signal, and transfers a power to the light emitting part,
    wherein the coating controller rectifies the power generated from the induction coil, and controls an operation of the light emitting part, and
    wherein the light guide plate transfers the light generated from the light emitting part.

9. The furniture having a wireless charging function of claim 8, wherein the coating controller receives a charging state information transmitted from the wireless power reception apparatus through the induction coil, and controls an operation of the light emitting part based on the charging state information.

* * * * *